(12) United States Patent
Cheskaty et al.

(10) Patent No.: US 7,246,036 B2
(45) Date of Patent: Jul. 17, 2007

(54) REMOTE MONITOR FOR STEAM TRAPS

(75) Inventors: Rex Cheskaty, Stuart, FL (US); William R. Horton, Three Rivers, MI (US); Michael H. Gaines, Kalamazoo, MI (US); Michael P. Hellman, Portage, MI (US); Lawrence J. Grubka, Vicksburg, MI (US)

(73) Assignee: Armstrong International, Inc., Three Rivers, MI (US)

( * ) Notice: Subject to any disclaimer, the term of this patent is extended or adjusted under 35 U.S.C. 154(b) by 79 days.

(21) Appl. No.: 11/006,789

(22) Filed: Dec. 8, 2004

(65) Prior Publication Data
US 2006/0118647 A1 Jun. 8, 2006

(51) Int. Cl.
*G06F 11/30* (2006.01)
*G01F 17/00* (2006.01)
*G01M 19/00* (2006.01)

(52) U.S. Cl. .................. 702/183; 702/51; 73/865.8

(58) Field of Classification Search .............. 236/93 R, 236/94; 137/1, 554, 557, 558; 73/865.8, 73/168; 702/45, 50, 51, 54, 182, 183
See application file for complete search history.

(56) References Cited

U.S. PATENT DOCUMENTS

| | | | |
|---|---|---|---|
| 4,508,135 A | 4/1985 | Schlesch et al. | |
| 4,630,633 A | 12/1986 | Vallery | |
| 5,715,177 A * | 2/1998 | Machida et al. | 702/62 |
| 5,947,145 A | 9/1999 | Schlesch et al. | |
| 5,992,436 A | 11/1999 | Hellman et al. | |
| 6,145,529 A | 11/2000 | Hellman et al. | |
| 6,424,930 B1 * | 7/2002 | Wood | 702/184 |
| 6,485,537 B2 | 11/2002 | Brilmaker | |
| 2002/0124666 A1 * | 9/2002 | Navarro et al. | 73/865.8 |

FOREIGN PATENT DOCUMENTS

GB  2189321 A  10/1987

OTHER PUBLICATIONS

"Ultrasound simplifies steam trap inspection", authored by Alan S. Bandes, dated Feb. 1, 2003 (4 pages).
"Ultrasonic Technology", The Technology (1 page).
"Computerized steam trap management system for productive maintenance" TLV Corporation TrapMan Model TM5/TrapManager (2 pages).
"Ultrasonic valve & steam trap inspection" Valve and steam trap application (1 page).
"SmartWatch™ RF"—A firm commitment to technological leadership in gas and steam leak detection systems (2 pages).

* cited by examiner

*Primary Examiner*—Chen Wen Jiang
(74) *Attorney, Agent, or Firm*—MacMillan, Sobanski & Todd, LLC

(57) ABSTRACT

An apparatus and method for monitoring the status of at least one steam trap includes at least one monitor including at least one sensor for sensing at least one process condition of the steam trap; at least one means for calculating an average of the at least one monitored process condition; and, at least one transmitter for transmitting at least one signal responsive to the averaged monitored process condition.

10 Claims, 6 Drawing Sheets

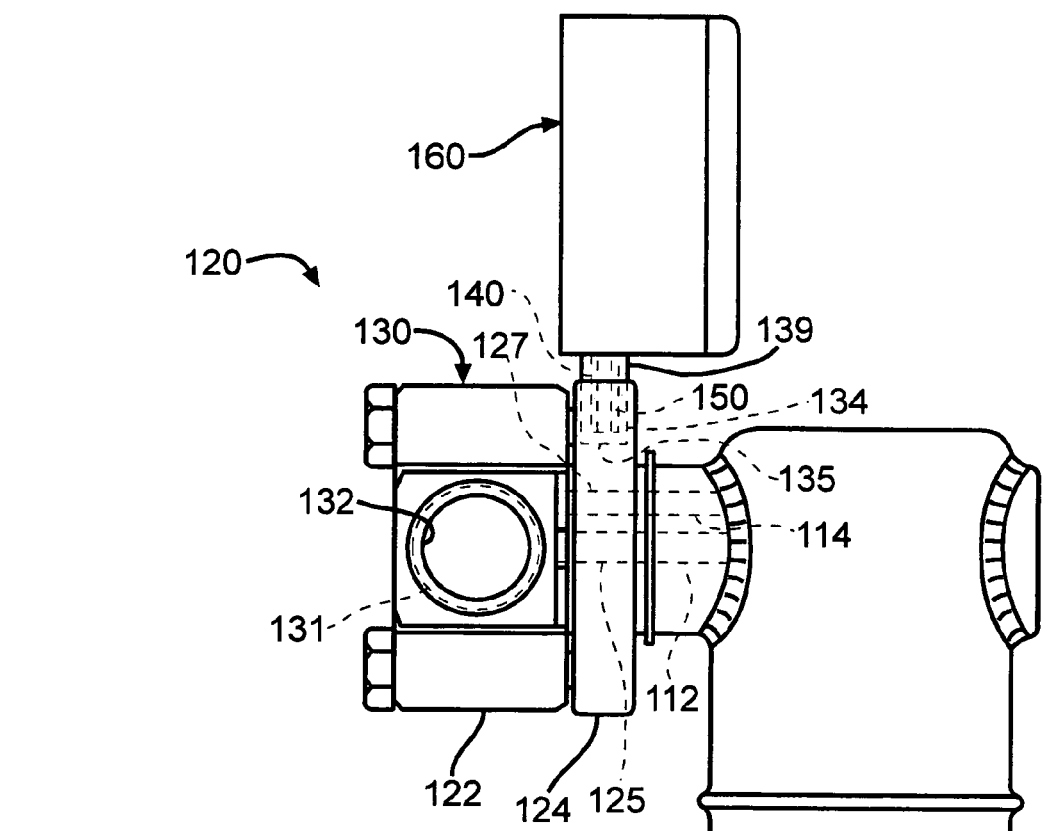
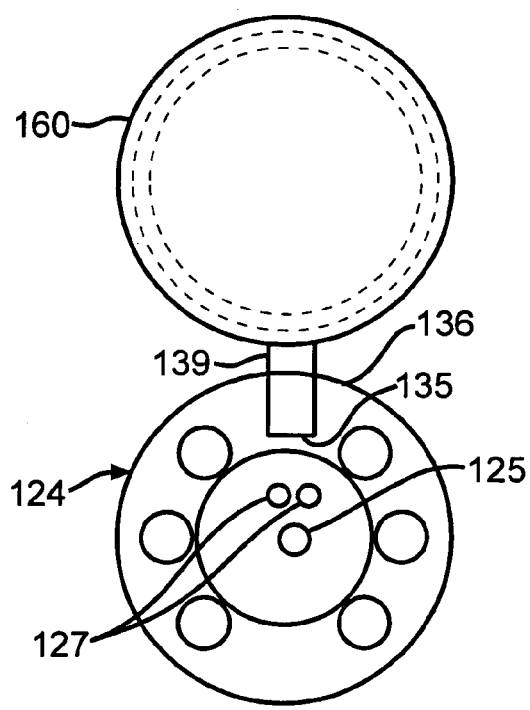
FIG. 3
FIG. 4

REMOTE MONITOR FOR STEAM TRAPS

TECHNICAL FIELD AND INDUSTRIAL APPLICABILITY OF THE INVENTION

The present invention relates primarily in general to systems for remotely monitoring the functionality of steam traps which remove condensate from process steam lines. More particularly, this invention relates to universally adaptable systems for remotely monitoring the performance and status of a large number of steam traps and for retrofitting existing steam traps.

BACKGROUND OF THE INVENTION

Steam traps are a common item of equipment in factories, refineries and other industrial or commercial facilities. The steam traps are installed in process steam lines and act to separate condensed steam, or "condensate", from the steam without allowing the steam to escape. The separated condensate is then recycled back through condensate return lines to the boiler for conversion back to steam. To be effectively operating, the steam trap must prevent steam from escaping past the steam trap and entering the condensate return lines. If steam is allowed to pass through the steam trap into the condensate return line, the result is a loss of valuable energy and a reduction in the efficiency of the steam system.

There are several well-known types of steam traps, including inverted bucket traps, float traps, thermostatic traps and disc traps. Manufacturing facilities, refineries and large buildings often are fitted with extensive systems of steam lines for heating and for process steam. Some of these facilities can contain 1,000 or more steam traps. To promote efficient operation of the steam traps, some type of monitoring or inspection is required to detect malfunctioning traps.

In the past, several different methods of checking the condition of steam traps have been used. One system uses a battery powered probe to sense the temperature of the traps. Another system uses a battery powered probe in an inverted bucket steam trap to sense the presence of water in the trap. When the inverted bucket steam trap has water in it, the trap has a state or condition referred to as "prime". A properly operating inverted bucket trap must have a condition of prime if it is functioning properly. A requisite amount of water in the trap is indicative of proper steam trap operation. A known steam trap monitoring system is disclosed in U.S. Pat. No. 4,630,633 to Vallery, which is hereby incorporated by reference. This patent discloses a probe extending into a steam trap, the probe being responsive to the level of condensate in the steam trap.

Other existing steam trap systems include signal lights on the steam traps indicative of the process conditions in the traps. Such systems require visual inspection of all the steam traps in the entire manufacturing facility for proper monitoring of the steam traps. In the past, this type of manual inspection has proven to be difficult to sustain. Without a rigorously enforced inspection system, malfunctioning traps will go undetected.

Another system to monitor steam traps is a hard wire system which includes physical wiring that is threaded from each of the steam traps to one or more centrally located steam trap control stations for receiving and storing data concerning the process conditions of the steam traps. It can be appreciated that, in large facilities, the work required to hard wire thousands of steam traps is very expensive, and, in fact, cost prohibitive. Hard wire systems are especially difficult to install in retrofit situations where the steam trap monitoring system is added after the facility is already built. Also, a hardwired system does not easily allow changes in the physical location of the steam traps.

Still other methods for monitoring steam traps included the transmission and reporting of data using radio frequencies, as disclosed in U.S. Pat. Nos. 5,992,436 and 6,145,529 to Hellman et al. and assigned to the present assignee herein, which references are fully incorporated herein by reference.

It would be advantageous if a steam trap monitoring system could be devised to economically convey process condition information from a multitude of steam traps to one or more control stations. Such a system should be operable with low maintenance and should be easy and economical to install. Further, the system not only should provide process conditions of the steam trap, but preferably should also be able to positively identify the steam trap from which the signal originates.

It would further be advantageous if a steam trap could be devised to remotely monitor a steam trap's functionality while the steam trap is in a working, or live, steam system.

It would be further advantageous if a monitoring system could be devised that is adaptable to be used with many types of steam traps.

It would be still further advantageous if a monitoring system could be devised that is capable of being added, or retrofit, to existing steam traps already in place in a working environment.

SUMMARY OF THE INVENTION

The above objects as well as other objects not specifically enumerated are achieved by a method of remotely monitoring steam traps using RF signaling to communicate the process conditions of the steam traps to a centralized receiving station.

According to this invention, there is provided a system for remotely monitoring a steam trap in a working, or live steam, system. This system includes a monitoring apparatus capable of being attached the steam trap to a steam line.

In certain aspects, the present invention is useful in new construction and/or re-piping situations where the apparatus is capable of being attached to a number of different styles of steam traps that are to be remotely monitored.

In certain other aspects, the present invention is useful for installation onto existing steam traps already in place and currently being used for monitoring of a live steam environment. In certain embodiments, the system includes a monitoring apparatus that adapts to an existing style of steam trap. The apparatus monitors the operational status of the steam trap and then communicates such information in a wireless transmission to a remote site.

In certain aspects, the invention relates to a method of monitoring the status of at least one steam trap. The method includes: sensing at least one process condition in the steam trap; calculating an average value of the at least one sensed process condition; transmitting at least one signal responsive to the averaged sensed process condition of the steam trap; and, receiving the averaged signals generated.

In certain aspects, the monitoring of the steam trap includes at least one temperature sensor which is operatively connected both to a monitoring device and to a transmitting device. In other embodiments, the monitoring of the steam trap furthers includes at least one acoustical sensor operatively connected both to the monitoring device and to the transmitting device.

According to this invention, there is also provided an apparatus for monitoring the status of at least one steam trap. The apparatus includes at least one monitor including at least one sensor for sensing at least one process condition of the steam trap; at least one means for calculating an average of the at least one monitored process condition; and, at least one transmitter for transmitting at least one radio frequency signal responsive to the averaged monitored process condition.

BRIEF DESCRIPTION OF THE DRAWINGS

FIG. 3 is a schematic illustration, partially in phantom, of a steam trap and a retro-fittable remote monitoring system.

FIG. 4 is a schematic illustration, partially in phantom, of a portion of the retro-fittable remote monitoring system shown in FIG. 3.

DETAILED DESCRIPTION OF THE INVENTION

Steam traps are automatic mechanical valves that discharge condensate (water) from a steam system (not shown). In a live steam system, if a steam trap fails to function properly, there are two possible failures: 1) failed "open", where an automatic valve in the steam trap is continuously in the open condition allowing condensate and live steam to exit the system; or, 2) failed "closed" where the trap retains all the condensate in the system and sends such back condensate back into the steam system, thereby reducing the efficiencies of the steam system and possibly damaging the process equipment.

Figure 1:
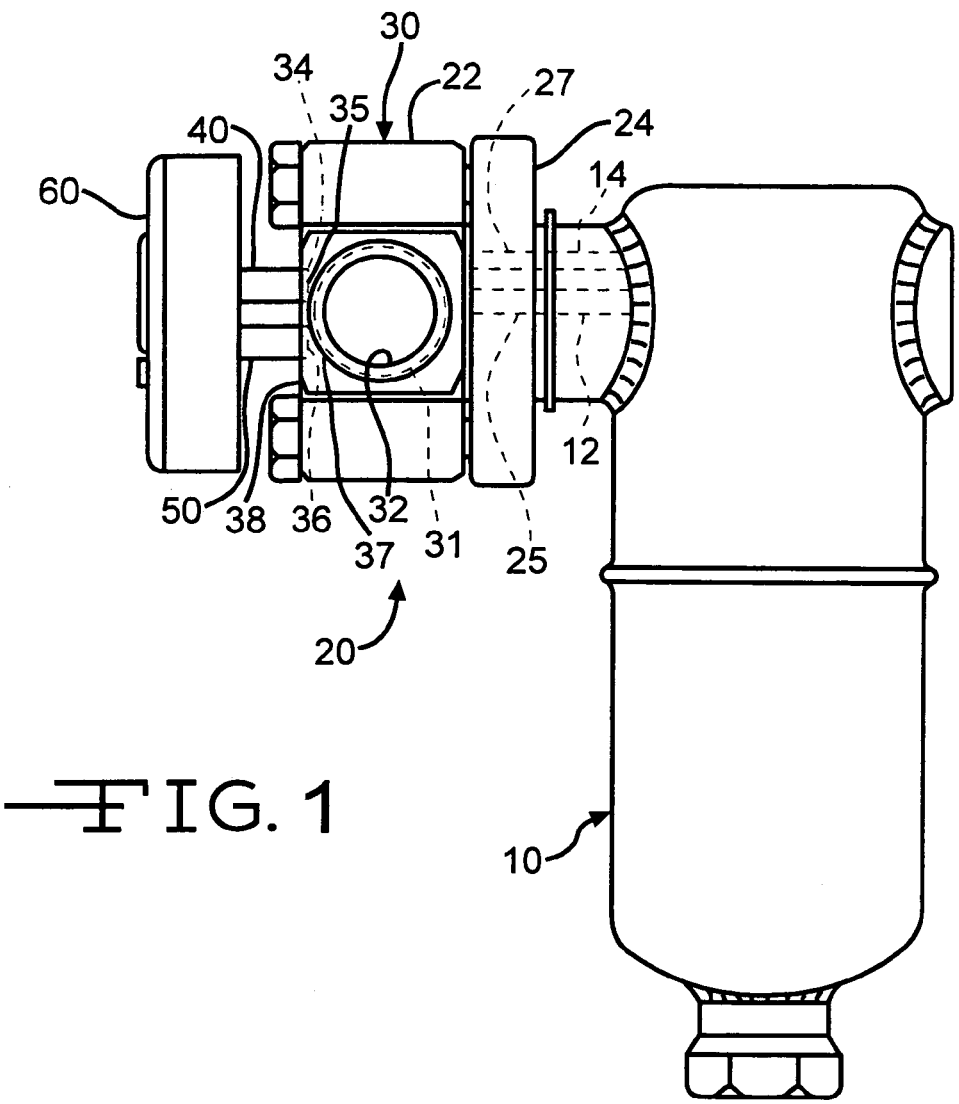
FIG. 1 is a schematic illustration, partially in phantom, of a steam trap and a remote monitoring system.

As shown in FIG. 1, one type of steam trap is generally indicated at 10. The depicted steam trap 10 is generally conventional and well known in the art, although it is to be understood that the invention can be used with other types of steam traps. The steam trap 10 is connected to a live steam line (not shown) which supplies steam into the steam trap 10. The steam trap 10 is also connected to a condensate return line (not shown) to direct the condensate back to the steam generator, such as a boiler (not shown). The steam trap 10 is connected to a remote monitoring system 20.

In the embodiment shown, the remote monitoring system 20 includes a connector block 30, at least one temperature sensor device 40, at least one acoustic sensor device 50, and at least one electronic monitoring device 60.

The connector block 30 allows the steam trap 10 to be efficiently installed in any piping configuration. One type of suitable connector block that can be modified to be useful in the present invention is described in U.S. Pat. No. 4,508,135 to Schlesch et al. and assigned to the present assignee herein, which reference is fully incorporated herein by reference.

The connector block 30 can be manufactured out of any suitable material that can withstand normal steam trap working pressures and temperatures. In certain embodiments, the connector block 30 is made of stainless steel. It is to be understood that suitable piping connections for the connector block 30 can be NPT, PSPT, socket weld, butt weld or any specialty connection that is acceptably used in the steam trap industry. In certain embodiments, the connector block 30 can have a strainer (not shown) for debris removal.

The connector block 30 is operatively connected to the steam trap 10 in a suitable manner as will be understood by those skilled in the art. In the embodiment shown, the connector block 30 includes a coupling 22 secured to a collar 24. The coupling 22 and collar 24 are in coaxial alignment with at least one inlet port 12 and at least one outlet port 14 in the steam trap 10, as in a manner described fully in the Schlesch et al. '135 patent. The collar 24 includes at least one steam inlet passage 25 and at least one steam outlet passage 27.

The coupling 22 of the connector block 30 includes at least one steam inlet passage 31 that receives steam from the upstream steam system. The steam inlet passage 31 is in communication with the inlet passage 25 in the collar 24, which, in turn, is in communication with the inlet port 12 in the steam trap 10. The coupling 22 in the connector block 30 also includes at least one steam outlet passage 32 that receives recovered steam from the steam outlet passage 27 in the collar 22 of the steam trap 10 and delivers the recovered steam to the downstream steam system. As is well understood, the supply of steam is diverted into the steam trap 10 where steam is trapped or retained in the system while condensate is removed from the system.

Figure 2:
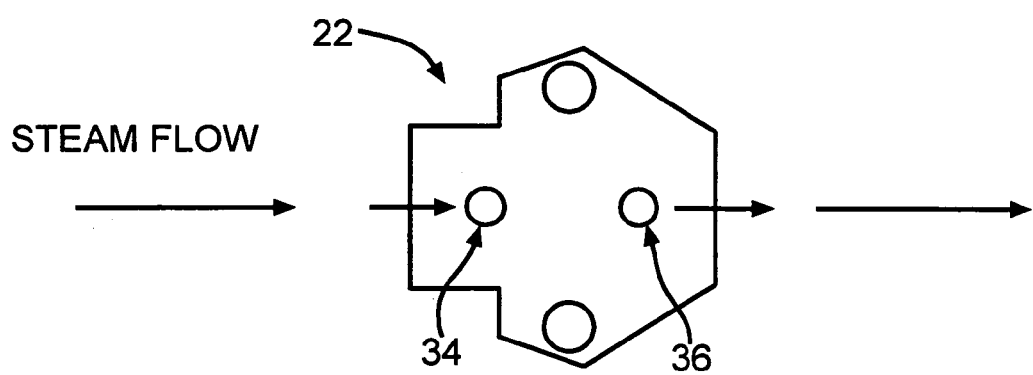
FIG. 2 is a schematic illustration showing openings for probes in a coupling of a connector block of a remote monitoring system.

In one aspect of the present invention, the connector block 30 defines a first orifice, or pocket 34 and a second orifice, or pocket, 36, as shown in FIG. 2. The first and second pockets 34 and 36 each extend inward from an outer surface 36 of the connector block 30. The first and second pockets 34 and 36 terminate at closed ends 35 and 37, respectively. The closed ends 35 and 37 are in a spaced apart relationship to the inlet and outlet passages 31 and 32 in the connector block 30.

The first pocket 34 has an interior dimension that readily accepts the temperature sensor device 40. The temperature sensor 40 is located within the connector block 30 in the first pocket 34 near the inlet port 31 in the connector block 30. The temperature sensor device 40 monitors the temperature of the steam entering the steam trap 10.

The second pocket 36 has an interior dimension that readily accepts the acoustic sensor device 50. The acoustical sensor device 50 is located within the connector block 30 in the second pocket 36 in a suitable manner. The acoustical sensor device 50 monitors sound emitting from the steam trap during the service life of the steam trap 10.

The electronic monitoring device 60 is operatively connected to the temperature sensor device 40 and to the acoustical sensor device 50. The electronic monitoring device 60 receives data from the temperature sensor device 40 and the acoustic sensor device 50 and provides the monitoring logic for the individual trap 10 to which it is connected.

The electronic monitoring device 60 can include any suitable enclosure for encasing the sensing equipment required for operation of the system. The electronic monitoring device 60 includes any suitable programmable device capable of controlling the gathering, storage and dissemination of process condition data. In certain embodiments, a suitable sensor controller is a PIC 16C22 chip from Microchip. It is to be understood that various input devices can be connected to the sensor controller to supply the sensor controller with data from the temperature sensor device 40 and from the acoustic sensor device 50. For example, electrodes (not shown) can be connected via lead lines (not shown) from the electronic monitoring device 60 to the temperature sensor device 40 and to acoustic sensor device 50 to provide input regarding the prime status (prime or no prime) of the steam trap 10. The electronic monitoring device 60 can be programmed to set a desired level for acceptable temperature and acoustical sensitivity.

In another aspect, the present invention relates to a remote monitoring system 120 that is especially useful for monitoring at least one steam trap already connected to a steam system. Referring now to FIGS. 3 and 4, a steam trap 110 is connected to a connector block 130. The remote monitoring system 120 can be installed between the steam trap 110 and an already hard piped connector block 130. The remote monitoring device 120 provides a cost effective and technologically advanced monitoring system for existing trap populations.

In the embodiment shown in FIGS. 3 and 4, the connector block 130 is operatively connected to the steam system in a suitable manner as will be understood by those skilled in the art. The connector block 130 includes a coupling 122 secured to a collar 124. The coupling 122 and collar 124 are in coaxial alignment with at least one inlet port 112 and at least one outlet port 114 in the steam trap 110, as in a manner described fully in the Schlesch et al. '135 patent. The collar 124 includes at least one steam inlet passage 125 and at least one steam outlet passage 127.

The coupling 122 of the connector block 130 includes at least one steam inlet passage 131 that receives steam from the upstream steam system. The steam inlet passage 131 is in communication with the inlet passage 125 in the collar 124, which is, in turn, in communication with the inlet port 112 in the steam trap 110. The connector block 130 also includes at least one steam outlet passage 132 that receives recovered steam from the steam outlet passage 127 in the collar 122 of the steam trap 110 and delivers the recovered-steam to the downstream steam system. As is well understood, the supply of steam is diverted into the steam trap 110 where steam is trapped or retained in the system while condensate is removed from the system.

The collar 124 of the connector block 130 defines a first orifice, or pocket, 134 which extends radially inward from an outer surface 136 of the collar 124. The first pocket 134 terminates at a closed end 135. The closed end 135 is in a spaced apart relationship to the inlet passage 131 and the outlet passage 132 in the connector block 130.

The first pocket 134 has an interior dimension that readily accepts a probe 139. The probe 139 can include at least one of a temperature sensor 140 and/or an acoustic sensor 150. The probe 139 is located within the first pocket 134 near the inlet port 131 in the connector block 130. The temperature sensor device 140 within the probe 139 monitors the temperature of the steam entering the steam trap 110. Likewise, the acoustical sensor device 150 within the probe 139 monitors sound emitting from the steam trap 110 during the service life of the steam trap 110.

The probe 139 is operatively connected to an electronic monitoring device 160 in such a manner that the electronic monitoring device 160 receives data from the temperature sensor device 140 and the acoustic sensor device 150 and provides the monitoring logic for the individual trap 110 to which it is connected.

Figure 5:
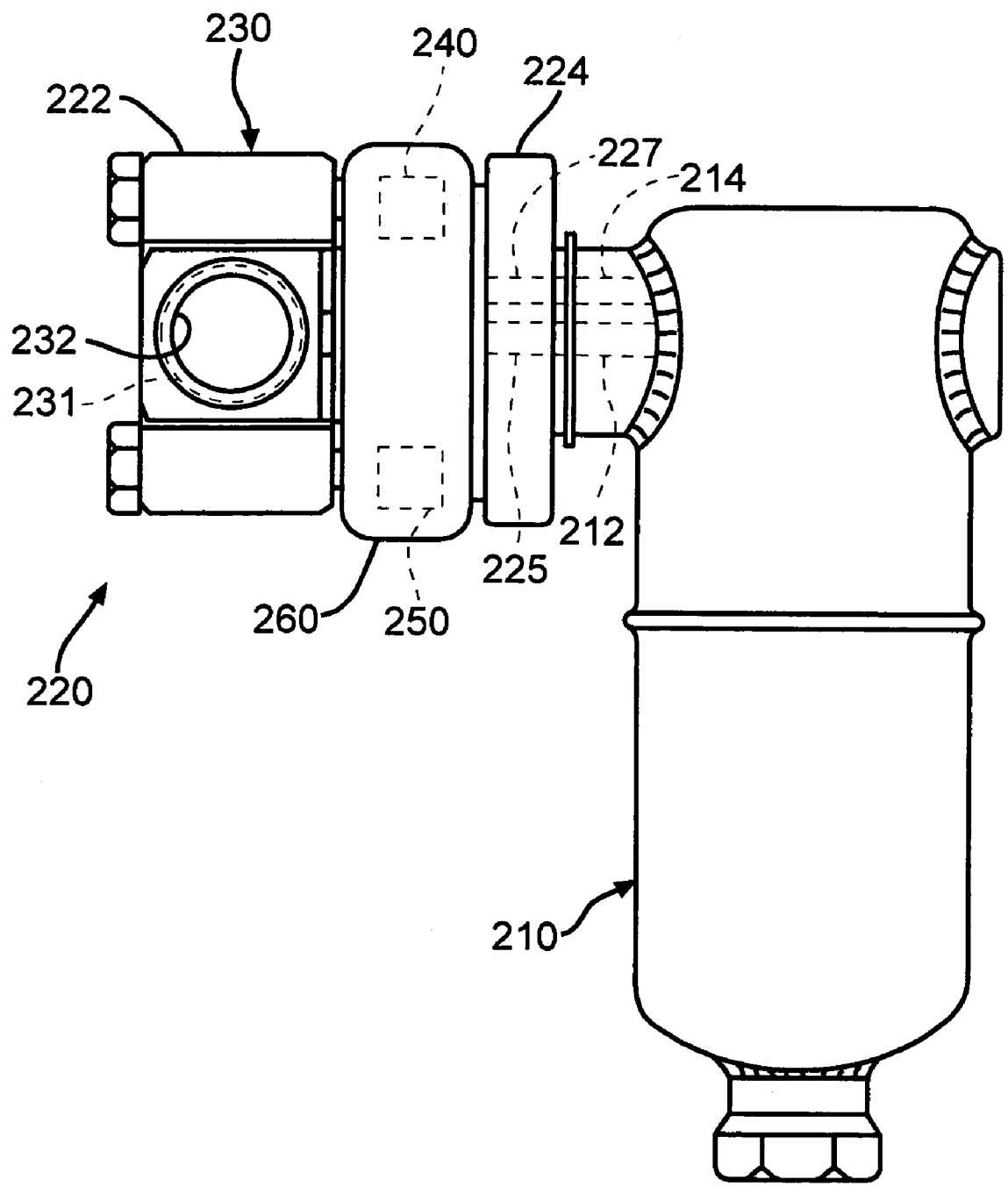
FIG. 5 is a schematic illustration, partially in phantom, of a steam trap and another embodiment of a retro-fittable remote monitoring system.

In another aspect, the present invention relates to a remote monitoring system 220 that is especially useful for monitoring at least one steam trap already connected to a steam system. Referring now to FIG. 5, a steam trap 210 is connected to a connector block 230. The remote monitoring system 220 can be installed between the steam trap 210 and an already hard piped connector block 220. The remote monitoring device 220 provides a cost effective and technologically advanced monitoring system for existing trap populations.

In the embodiment shown in FIG. 5, the connector block 230 is operatively connected to the steam system in a suitable manner as will be understood by those skilled in the art. The connector block 230 includes a coupling 222 that is in a spaced apart relationship to a collar 224. The coupling 222 and collar 224 are in coaxial alignment with at least one inlet port 212 and at least one outlet port 214 in the steam trap 210, as in a manner described fully in the Schlesch et al. '135 patent. The collar 222 includes at least one steam inlet passage 225 and at least one steam outlet passage 227.

The coupling 222 of the connector block 230 includes at least one steam inlet passage 231 that receives steam from the upstream steam system. The steam inlet passage 231 is in communication with the inlet passage 225 in the collar 224, which is, in turn, in communication with the inlet port 212 in the steam trap 210. The coupling 222 of the connector block 230 also includes at least one steam outlet passage 232 that receives recovered steam from the steam outlet passage 227 in the collar 222 of the steam trap 210 and delivers the recovered steam to the downstream steam system. As is well understood, the supply of steam is diverted into the steam trap 210 where condensate is trapped or retained, and then removed from the system.

An electronic monitoring device 260 is coaxially positioned between the coupling 220 and the collar 240. The electronic monitoring device 260 can include at least one of a temperature sensor 240 and/or an acoustic sensor 250. The temperature sensor device 240 monitors the temperature of the steam entering the steam trap 210. Likewise, the acoustical sensor device 250 monitors sound emitting from the steam trap 210 during the service life of the steam trap 210.

The temperature sensor 240 and the acoustic sensor 250 are operatively connected to the electronic monitoring device 260 in such a manner that the electronic monitoring device 260 receives data from the temperature sensor device 240 and the acoustic sensor device 250 and provides the monitoring logic for the individual trap 210 to which it is connected.

It is also within the contemplated scope of the present invention, that at least one or more other input devices for monitoring process conditions can be included in the connector block, such as, for example, a pressure switch which is connected to the sensor controller in a suitable manner. Any suitable connection can be used. The pressure switch senses the pressure within the steam line, and this information is supplied to the sensor controller. Pressure switches are well known to those skilled in the art of steam process instrumentation. In addition to the process condition sensing devices described above (pressure, temperature and prime), other sensors, not shown, could be employed to sense other process conditions.

According to one aspect of the present invention, the system includes a method by which the electronic circuitry of the monitoring device is programmed to learn the individual operational characteristics of the individual steam trap connected to the connector block. The method includes monitoring tolerance levels to establish an upper tolerance level and a lower tolerance level that represent acceptable operational sound levels for the specific type and application of the individual trap.

The method also includes monitoring minimum temperatures within the steam trap to check for proper operational temperatures. The checks, or queries, are made on a regular basis to minimize energy loss in the event of steam trap malfunction. During the query, comparisons of actual sound levels are made to the sound levels created by the steam trap during the initial set-up. If the acoustical comparison is within the upper and lower limits of the baseline sounds, the query stops and a new query is initiated again per a predetermined schedule.

If the operational sound levels collected during a query are outside the upper or lower limits, an accelerated query schedule is conducted. If the queries consistently exceed the upper or lower sound limits, the steam trap is identified as a maintenance item.

The temperature sensor will sense if the steam temperature has reached a minimum temperature of 212° F. (normal minimum for steam to be present atmospheric pressure). The temperature sensor senses hot (>212° F.) or cold (<212° F.) and relays that data to the monitoring device. This data, in turn, is used to determine if the trap connected to the connector block is located on an active (live) steam line. The monitoring device obtains data from the temperature sensor and acoustic sensor and transmits such data to at least one receiver (not shown) connected to a base computer (not shown). This information, once reported to the base computer, can be automatically accessed via the Internet for offsite remote monitoring. This information can be transmitted at set intervals to maintain efficiencies in the steam system.

In certain embodiments, the present invention includes monitoring the status where the averaged signals transmitted from the steam traps are transmitted periodically, and the transmitters emit signals of differing frequency to provide diversity. In certain systems, the method includes taking a predetermined number of readings (in certain embodiments, at least 4 readings) to calculate the average of the at least one process condition of the steam trap. Also, the period of time between successive averaging of sensing process condition can be within the range of from about 0.2 to about 5 seconds, and the period between successive steps of transmitting signals to the receiver can be within the range of from about 0.5 to about 300 seconds. The transmitter periodically transmits a signal indicative of the process condition to the receiver when the sensed process condition is within programmed limits, but where the signal from the transmitter is transmitted to the receiver immediately upon detection of a condition outside the programmed limits.

It is to be understood that the transmission and reporting of data via radio frequency systems can be conducted using the technology as fully described in the U.S. Pat. Nos. 6,145,529 and 5,992,436, which patents are fully incorporated herein by reference. In certain embodiments, a transmitter microprocessor and a microprocessor-based radio frequency transmitter are positioned within the electronic monitoring device. The transmitter microprocessor receives input from the sensor controller. The transmitter transmits an appropriate radio frequency (RF) signal responsive to the sensed process conditions. The transmitter microprocessor can be any suitable device that is programmable and is capable of receiving the output from the sensor controller. A suitable transmitter microprocessor is a model 68HC05 microprocessor by Motorola. The transmitter can be any suitable device for transmitting an appropriate radio frequency signal responsive to the condition of the steam trap. A preferred transmitter is a model FA 210 universal transmitter by Inovonics Corporation, Boulder, Colo. It is to be understood that a single programmable microprocessor can be used to control both the sensing and transmitting functions.

Also, it is within the contemplated scope of the present invention that at least one battery is provided within the electronic monitoring device to provide power to the components within the monitoring device. Any suitably sized battery, such as a 3-volt battery, can be used. The programmable sensor controller and the programmable transmitter are programmed to operate periodically but for only short periods of time, so that current is drawn from the battery for only periods of short duration. This method greatly prolongs the life of the battery, thereby lengthening the time before servicing the steam trap monitoring system is required. Preferably, the monitoring system is a send only system, capable of sending signals but not receiving signals. To receive signals, the monitor would have to be fitted with a receiver that would have to be activated or powered either continuously, or at least periodically, thereby causing an additional drain on the battery, and shortening the service life of the battery. By designing the steam traps to have no means for receiving signals from a separate signaling device, such as a remote transmitter, the efficiency of the system is enhanced. It is to be understood, however, that the monitors could also be provided with receivers, not shown.

In operation, the monitoring system of the invention transmits an RF signal directed toward a receiver. The receiver can be any suitable device for picking up the RF signal. It is to be understood that the characteristics of the receiver must be matched to those of the transmitter to provide a proper communications link and optimal RF performance. A preferred receiver is an Inovonics FA403 receiver. Associated with the receiver is a data-handling device, such as a computer (not shown) for storing and displaying data from the steam trap. Preferably, the computer is adapted to provide alarms or other indications when steam traps are determined to be malfunctioning.

In some installations of the monitoring system there will be sufficient distance between the steam trap and the receiver that the RF signal will be too weak or attenuated at the receiver for reliable data transmission. Therefore, the system can include a repeater (not shown) positioned between the steam trap and the receiver. The repeater receives the RF signal from the transmitter, amplifies the signal and rebroadcasts the signal. Suitable repeaters are commercially available from Inovonics. The repeater should also be matched to the characteristics of the transmitter and receiver to provide a working communications link. A preferred repeater is a model 525 repeaters by Inovonics. The repeater receives the signal from the steam trap monitor and re-broadcasts the signal with enough strength to reach the receiver. It is to be understood that several repeaters can be used in series to extend the length between remote steam traps and the receiver.

Another aspect of the invention is the ability of the monitoring system to remotely monitor the steam trap and to learn the individual operational characteristics of the steam trap. The programmable sensor controller can be programmed with an algorithm which tests or senses various process conditions at the initial start-up and then throughout the operation of the steam trap.

In a specific embodiment of the invention, the remote monitoring system actively determines the process conditions and establishes the status of the steam traps within a period of active time, and remains inactive for a period of inactive time. The result of such process condition monitoring is a status of the steam trap within desired parameters. The status of the steam trap is then transmitted to the transmitter microprocessor.

The transmitter and programmable transmitter microprocessor operate somewhat independently of the remote monitoring system. The transmitter microprocessor is programmed to look at or sense the status of the steam trap as reported by the remote monitoring system. This sensing or sampling by the transmitter microprocessor occurs periodically, such as perhaps once every half second. The transmitter periodically transmits an RF signal indicative of the status of the steam trap. The transmitting of the RF signal can be accomplished with a period different from the period of the sampling by the transmitter microprocessor. Preferably, the period between successive steps of transmitting signals to the receiver is within the range of from about 0.5 to about 300 seconds. However, upon detection of a condition outside the programmed limits, the signal from the transmitter is transmitted to the receiver immediately.

Figure 6A:
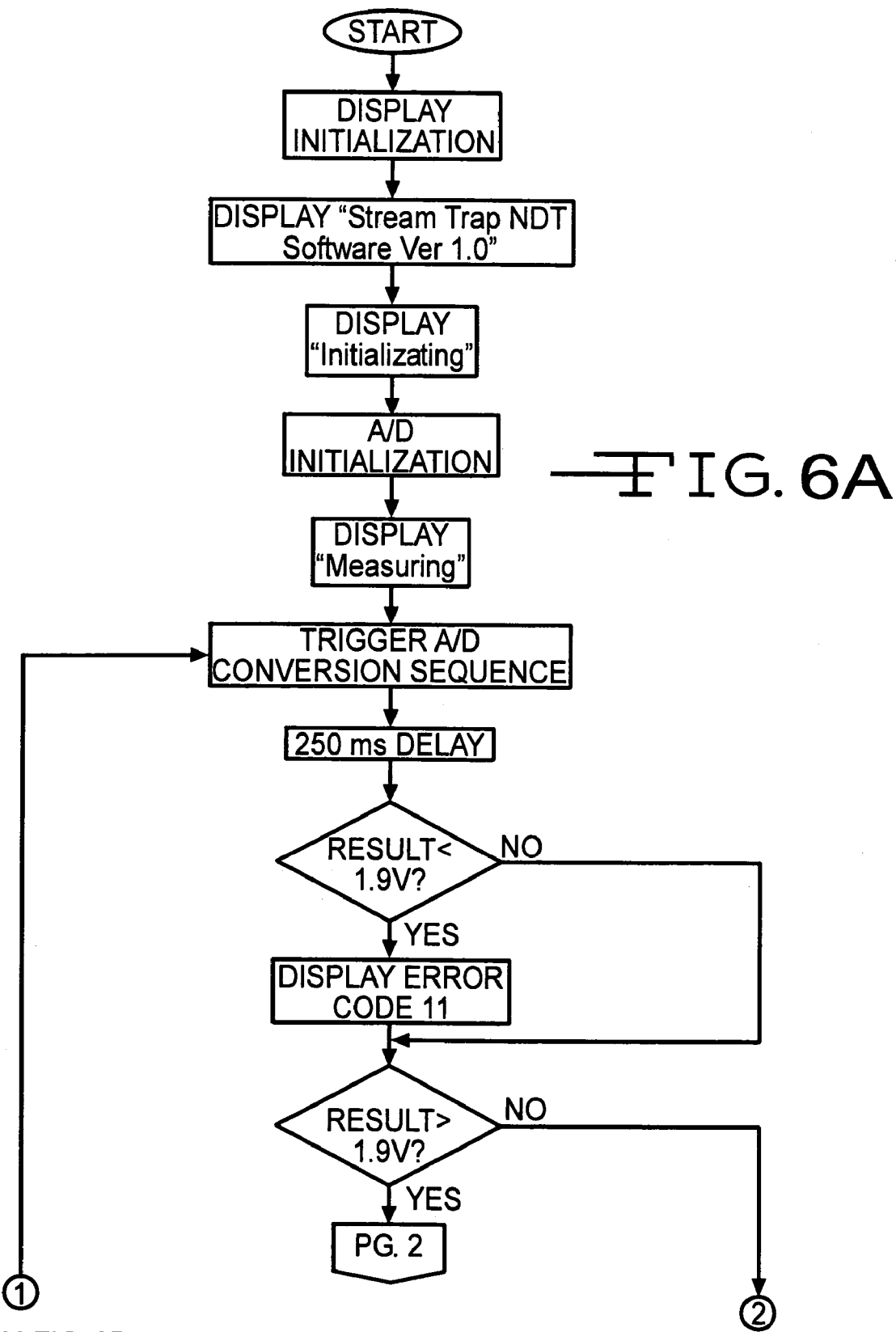
FIGS. 6a and 6b show a flow diagram of the operating algorithm of the remote monitoring system.
Figure 6B:
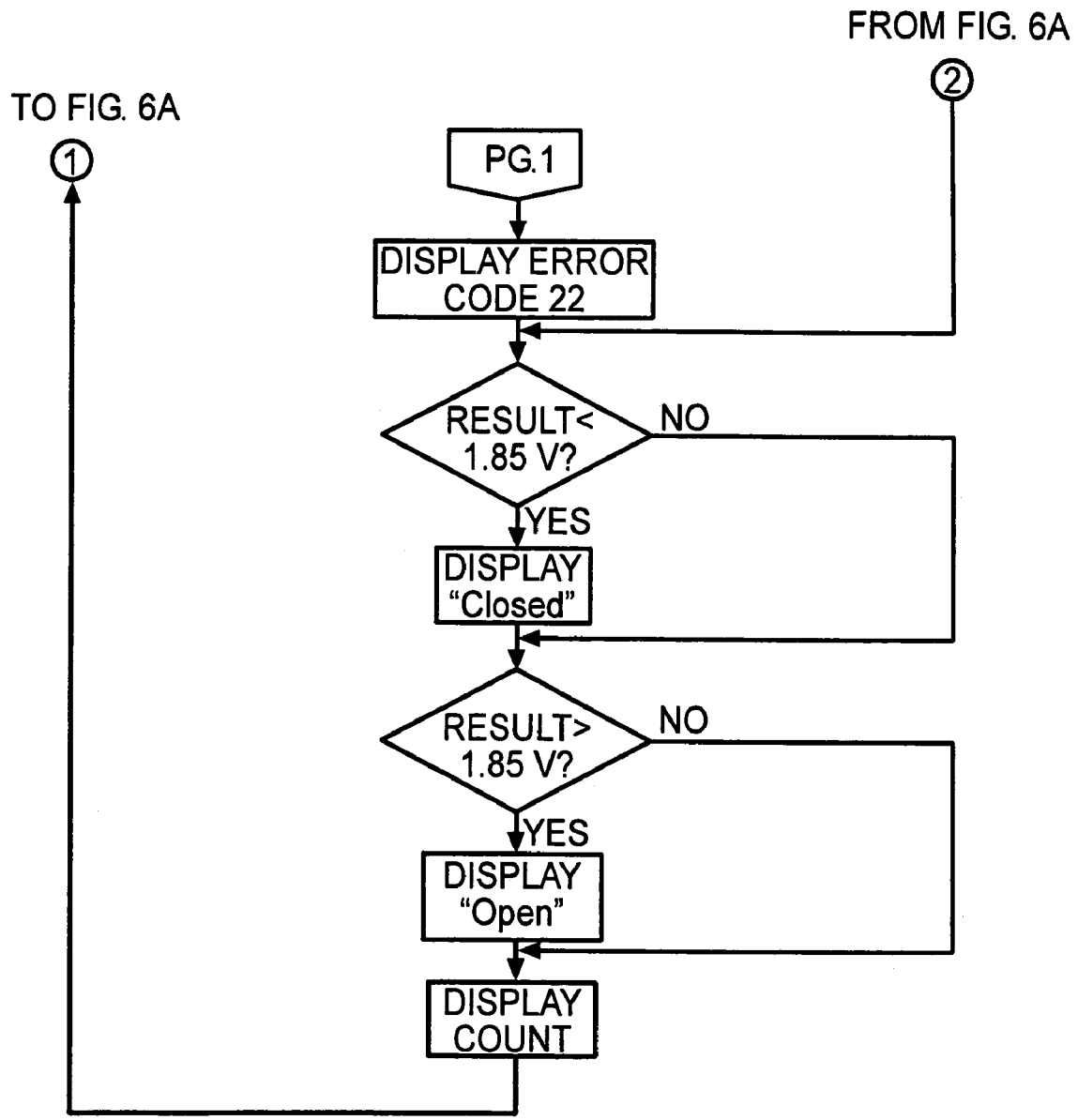

One suitable operating algorithm is shown in FIGS. 6a-6b; however, it is to be understood that different algorithms could be used to operate the system of the invention. At start-up there are display initialization steps, noted as "Display Initialization", "Display 'Steam Trap NDT Software Ver 1.0'", "Display 'Initializing'", "A/D Initialization", and "Display 'Measuring'".

The next step involves a "Trigger A/D Conversion Sequence" then a Delay, which is noted herein as 250 ms, but which can be adjusted to meet the specific requirements of the individual steam trap. For example, FIGS. 6a-6b show one suitable algorithm where the system checks to determine whether a reading is less than a prescribed voltage (noted in FIG. 6a as <1.8 V). If the resulting reading is Yes, an error code is displayed, and at least another reading is taken. In certain embodiments, a series of repeated readings are taken within a predetermined short time span. If the error code still is registered, a signal is sent showing a malfunction of the steam trap.

If the result is No, then the system checks to determine whether the resulting reading is greater than a prescribed voltage (noted in FIG. 6a as >1.9 V). If the resulting reading is Yes, an error code is displayed, and another reading is taken.

If the result is No, then the system checks to determine whether the resulting reading is less than a prescribed voltage (noted in FIG. 6b as <1.85 V). If the resulting reading is Yes, a "Display 'Closed'" is shown and another reading is taken at an appropriate time since the system is being registered as in working condition.

If the result is No, another reading is taken to determine whether the result is greater than a prescribed voltage, (noted in FIG. 6b as >1.85 V). If the resulting reading is Yes, a "Display 'Open'" is shown and a Display Count occurs, which then causes the system to repeat the sequence from the "Trigger A/D Conversion Sequence" step.

If the result is No, the Display Count occurs, causing the system to repeat the sequence from the "Trigger A/D Conversion Sequence" step.

Figure 7:
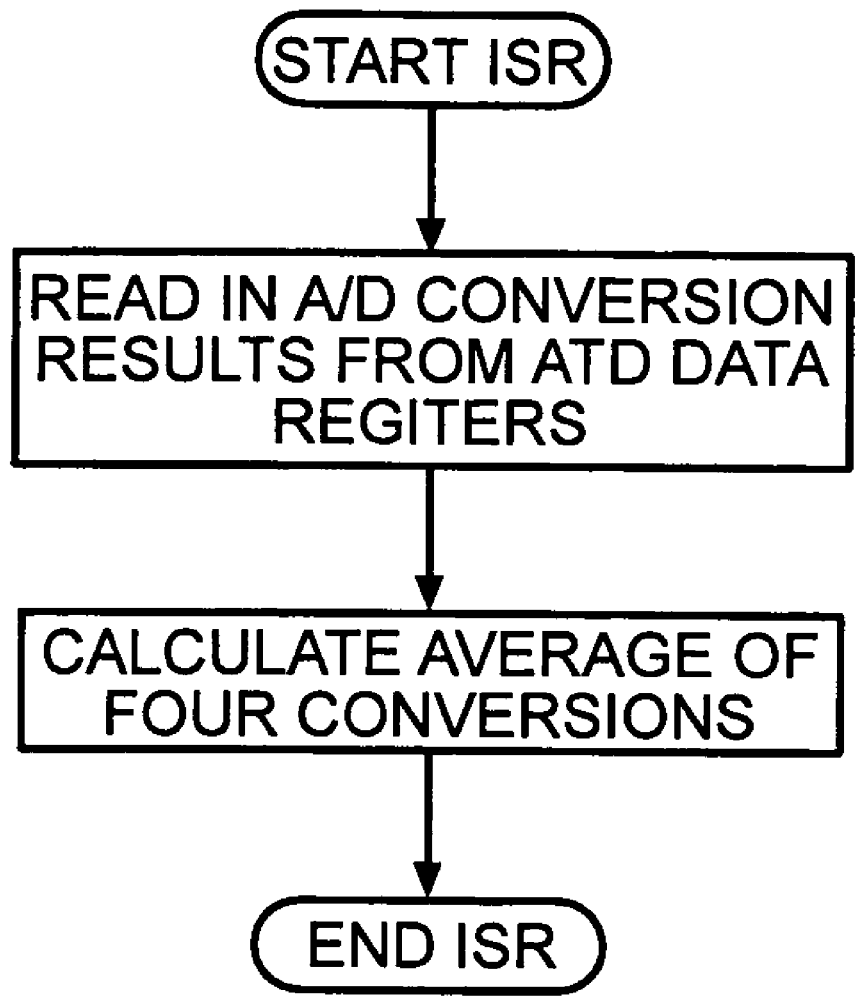
FIG. 7 shows a flow diagram of an ISR operating algorithm of the remote monitoring system.

After the ATD conversion sequence as shown in FIGS. 6a-6b is completed and the results are available in data registers, the system conducts an averaging to determine the specific parameters of the individual steam trap. FIG. 7 shows a further process where the system follows the following steps: Start TSR, Read in A/D conversion results from the ATD data registers, calculate an average (noted in FIG. 7 as four conversions) and End ISR.

The principle and mode of operation of this invention have been described in its preferred embodiment. However, it should be noted that this invention may be practiced otherwise than as specifically illustrated and described without departing from the scope of the invention.

What is claimed is:

1. A remote monitoring system comprising: a sensor device for sensing a process condition of a steam trap; an electronic monitoring device operatively connected to the sensor device to receive data from the sensor device; and a connector block including an inlet passage suitable for communication with an inlet port of a steam trap and including an outlet passage suitable for communication with an outlet port of a steam trap, the connector block connected to one of the sensor device and the electronic monitoring device.

2. The remote monitoring system of claim 1 wherein the sensor device includes an acoustic sensor.

3. The remote monitoring system of claim 1 wherein the sensor device includes a temperature sensor.

4. The remote monitoring system of claim 1 wherein the connector block defines a pocket extending inward from an outer surface for accepting the sensor device.

5. The remote monitoring system of claim 4 wherein the pocket terminates at a closed end.

6. The remote monitoring system of claim 1 wherein the connector block includes a coupling secured to a collar.

7. The remote monitoring system of claim 6 wherein one of the coupling and the collar defines a pocket extending inward from an outer surface for accepting the sensor device.

8. The remote monitoring system of claim 7 wherein the pocket terminates at a closed end.

9. The remote monitoring system of claim 1 wherein the electronic monitoring device provides monitoring logic.

10. The remote monitoring system of claim 1 wherein the electronic monitoring device includes a programmable device capable of controlling the gathering, storage and dissemination of process condition data.

* * * * *